(12) United States Patent
Tanumihardja et al.

(10) Patent No.: US 10,321,109 B1
(45) Date of Patent: Jun. 11, 2019

(54) LARGE VOLUME VIDEO DATA TRANSFER OVER LIMITED CAPACITY BUS

(71) Applicant: Vulcan Inc., Seattle, WA (US)

(72) Inventors: Mars Tanumihardja, Seattle, WA (US); Joseph Laurino, Sammamish, WA (US); Ashly Yeo, Bothell, WA (US)

(73) Assignee: Vulcan Inc., Seattle, WA (US)

( * ) Notice: Subject to any disclaimer, the term of this patent is extended or adjusted under 35 U.S.C. 154(b) by 145 days.

(21) Appl. No.: 15/622,009

(22) Filed: Jun. 13, 2017

(51) Int. Cl.
| | |
|---|---|
| *H04N 9/64* | (2006.01) |
| *G09G 5/36* | (2006.01) |
| *G06T 1/00* | (2006.01) |
| *H04N 19/10* | (2014.01) |
| *H04N 13/354* | (2018.01) |

(52) U.S. Cl.
CPC ............ *H04N 9/641* (2013.01); *G09G 5/363* (2013.01); *G06T 1/0007* (2013.01); *H04N 13/354* (2018.05); *H04N 19/10* (2014.11)

(58) Field of Classification Search
CPC .............................. H04N 9/641; G09G 5/363
USPC .................................................. 345/501, 502
See application file for complete search history.

(56) References Cited

U.S. PATENT DOCUMENTS

| | | | |
|---|---|---|---|
| 7,649,537 B2 * | 1/2010 | Campbell | ............... G06T 1/20 345/502 |
| 9,094,675 B2 | 7/2015 | Lukk et al. | |
| 2012/0176481 A1 | 7/2012 | Lukk et al. | |
| 2017/0069134 A1 | 3/2017 | Shapira et al. | |
| 2017/0095732 A1 | 4/2017 | Ghaffari et al. | |

(Continued)

FOREIGN PATENT DOCUMENTS

GB 2537438 A * 10/2016 ............. G09G 5/363

(Continued)

OTHER PUBLICATIONS

"3 Types of VR Capture," Boost VC, retrieved on the Internet on May 27, 2017, at https://medium.com/boost-vc/3-types-of-vr-capture-132d7eb01a57, 4 pages.

(Continued)

*Primary Examiner* — Jacinta M Crawford
(74) *Attorney, Agent, or Firm* — Ellen M. Bierman; Lowe Graham Jones PLLC (57) ABSTRACT

Methods, systems, and techniques for projecting streamed video are provided. Example Enhanced Video Systems provide support for streaming high resolution video in limited bandwidth hardware environments. In one example, an Enhanced Video System comprises a real time, interactive rendering system, a display system, and one or more display units. The rendering system comprises a high resolution graphics engine (e.g., a VR/AR gaming engine) capable of generating high resolution video and two graphics computation units. The projection system comprises two video capture cards to capture the generated video stream and forward the captured video stream to a projection mapping engine. Projection mapping engine consolidates and stitches together the received video stream as appropriate to render the video stream over display units to the target viewing environment such as a dome/sphere. In the example described, an 8K resolution video is streamed and projected despite bandwidth limitations of current video capture card technology.

21 Claims, 9 Drawing Sheets
(2 of 9 Drawing Sheet(s) Filed in Color)

(56) References Cited

U.S. PATENT DOCUMENTS

| | | | |
|---|---|---|---|
| 2017/0104980 A1 | 4/2017 | Tran et al. | |
| 2017/0336705 A1* | 11/2017 | Zhou | G06T 3/0062 |
| 2018/0084293 A1* | 3/2018 | Nehru | G09G 5/363 |
| 2018/0091767 A1* | 3/2018 | Geng | H04N 7/01 |

OTHER PUBLICATIONS

"A Brief Introduction to Photogrammetry and Remote Sensing," GIS Lounge, retrieved on the Internet on May 26, 2017, at https://www.gislounge.com/a-brief-introduction-to-photogrammetry-and-remote-sensing/, 3 pages.

"Become the Virus in Zero Days VR: A Revolutionary Immersive Documentary," VRScout, retrieved on the Internet on May 27, 2017, at https://vrscout.com/news/zero-days-vr-revolutionary-immersive-documentary/, 12 pages.

Lang, Ben, "Believe the Hype: HypeVR's Volumetric Video Capture is a Glimpse at the Future of VR Video," Jan. 10, 2017, retrieved on the Internet on May 28, 2017, at http://www.roadtovr.com/believe-hype-hypevrs-volumentric-video-capture-glimpse-future-vr-video, 4 pages.

Bourke, Paul, "Converting to/from cubemaps," Nov. 2003, updated May 2006 and Jul. 2016, 9 pages.

Lee, Nicole, "Facebook's new 360 cameras bring exploration to live videos," engadget.com, Apr. 19, 2017, 10 pages.

"Getting the real into virtual reality," Reality Capture, Graham Wakefield, 2016, retrieved on the Internet on May 27, 2017, at http://grrrwaaa.github.io/courses/film6246/real.html, 6 pages.

Miller, Julie, "How Lady Gaga Turned into David Bowie for Her 2016 Grammys Performance," Vanity Fair, Feb. 15, 2016, retrieved on the Internet on May 28, 2017, at http://www.vanityfair.com/hollywood/2016/02/1ady-gaga-2016-grammy s-david-bowie-performance-video, 5 pages.

Mufson, Beckett, "How to See Stuxnet? 'Zero Days' Filmmakers Find an Unlikely Answer in VR," Creators, Jan. 26, 2017, retrieved on the Internet on May 27, 2017, at https://creators.vice.com/en_us/article/zero-days-vr-sundance-debut, 8 pages.

"OTOY and Facebook Release Revolutionary 6DOF Video VR Camera Pipeline and Tools," Apr. 21, 2017, retrieved on the Internet on May 30, 2017, through https://home.otoy.com/, 5 pages.

"Photogrammetry," from Wikipedia, retrieved on the Internet on May 26, 2017, at https://en.wikipedia.org/wiki/Photogrammetry, 5 pages.

Maimone, Andrew et al., "Real-Time Volumetric 3D Capture of Room-Sized Scenes for Telepresence," Department of Computer Science, University of North Carolina at Chapel Hill, 4 pages.

George, James, "The Brief History of Volumetric Filmmaking," retrieved on the Internet on May 27, 2017, at https://medium.com/volumetric-filmmaking/the-brief-history-of-volumetric-filmmaking-32b3569c683 1, 18 pages.

"Networking Overview," Unity Manual, unity3d.com, retrieved on the Internet on May 28, 2017, at https://docs.unity3d.com/Manual/UNetOverview.html?_ga=2.122379275.1073641429.1496002446-647492717.1486775837, 3 pages.

"Network System Concepts," Unity Manual, unity3d.com, retrieved on the Internet on May 28, 2017, at https://docs.unity3d.com/Manual/UNetConcepts.html?_ga=2.165173055.1073641429.1496002446-647492717.1486775837, 4 pages.

"Using the Network Manager," Unity Manual, unity3d.com, retrieved on the Internet on May 28, 2017, at https://docs.unity3d.com/Manual/UNetManager.html, 10 pages.

Machkovech, Sam, "Volumetric capture is the swift kick in the butt VR so desperately needs," Ars Technica, Mar. 21, 2017, retrieved on the Internet on May 26, 2017, at https://arstechnica.com/gaming/2017/03/volumetric-capture-is-the-swift-kick-in-the-butt-vr-so-desperately-needs/, 5 pages.

Terdiman, Daniel, "Why Volumetric VR Is the Real Future of Virtual Reality," Fast Company Newsletter, Dec. 9, 2015, retrieved on the Internet on May 26, 2017, at https://www.fastcompany.com/3054317/why-volumetric-vr-is-the-real-future-of-virtual-reality, 7 pages.

Bourke, Paul, "Workflow for creating 360 spherical (equirectangular) panoramas," Dec. 2013, retrieved on the Internet on Feb. 10, 2017, at http://paulbourke.net/miscellaneous/sphericalpano/, 8 pages.

\* cited by examiner

LARGE VOLUME VIDEO DATA TRANSFER OVER LIMITED CAPACITY BUS

TECHNICAL FIELD

The present disclosure relates to methods, techniques, and systems for representing and transferring video data and, in particular, to methods, techniques, and systems for transferring and representing a large or high volume of video data over limited capacity pathways.

BACKGROUND

Graphics engines, such as those used to produce 3D video games for real time, or near real-time interactivity, generate large amounts of video data to represent their worlds and the objects found therein. These objects and the background environment change sometimes rapidly in response to user interaction. Often the graphical calculations used to produce the 2-dimensional (2D) and 3-dimensional (3D) images are computed on high powered gaming engine systems using specialize graphics processing units (GPUs). These GPUs then generate video data which is displayed on high resolution displays typically directly connected to the computer hosting the GPUs for better response time and drawing speed. The faster the action and the more detailed the representation of the worlds and objects, the more video data produced. Applications such as virtual reality and augmented reality, other than in the form of games also require large amounts of video data in very short amounts of time. However, high resolution displays are currently limited to 4K resolution and thus the quality of the video produced is ultimately directly aligned with and limited to the capacity of the display technology and other hardware factors.

Cinematic projection of video is similarly limited by the resolution and speed of the projectors. Greater resolution, such as 8K, is desirable for hemispherical full dome applications such as projected in planetariums.

BRIEF DESCRIPTION OF THE DRAWINGS

The patent or patent application file contains at least one drawing executed in color. Copies of this patent or patent application publication with color drawings will be provided by the Office upon request and payment of the necessary fee.

DETAILED DESCRIPTION

The world of real time (near real time) virtual reality (VR) and augmented reality (AR) content calls upon the ability for large amounts of video data to be generated and displayed to a user quickly whether on a computer or television display or whether projected onto a screen or some other object. Moreover, the data may change rapidly such as to depict a scene in motion, to respond to a user's motion, or to interact with a user. For example, when a user is playing a video game where the user participates, as the user moves, the environment and objects are modified, sometimes even continuously, consistent with the "game map"—an internal map directing where the objects including the user exist in the hypothetical world of the game. This internal map is used to determine what needs to be rendered on a display and when it should be displayed. In a classical depiction rendered on a computer display screen, for example, the gaming system doesn't have to display what is "behind" the user unless the user turns to look in that direction. This generally holds true in a VR or AR environment as well when the viewpoint being depicted originates from a user placed within the world, such as from a user's point of view.

For the purposes of this disclosure, real time refers to almost real time, near real time, or time that is perceived by a user as substantially simultaneously responsive to activity. Augmented reality refers to technology that superimposes one or more computer-generated images on a user's view of the real world, thus providing a composite view of what a user sees. Virtual reality refers to computer-generated simulation of an image or environment that can be interacted with in a seemingly real or physical way by a person. In some instances a virtual reality simulation is interacted with by a person unadorned with specialized equipment. In other instances, virtual reality simulation is interacted with using specialized equipment such as a VR helmet, gloves with sensors, and the like.

In some environments, a need for streaming the video data to a location that is separate or distinct from (e.g., not directly connected to) the generated video may be desired. For example, when it is desired to portray a scene, such as in a movie, augmented reality depiction, or virtual reality depiction, it may be required to stream and project video data onto one or more screens, displays, or three dimensional objects. The video data may be projected or rendered using display systems or display units such multiple projectors depending upon the intended projection "view." For example, to implement a "surround video" system, video data may be projected using multiple projectors to provide a 360 degree view of a scene. Other environments, for example, a panorama 180 degree view, may require fewer projectors or display systems. In some such environments a user may even be allowed to walk around within a space defined by the projection that enables the user to view the surrounding video from many different vantage points (the projection thus physically surrounding the user). A surround video system thus includes projecting or rendering a much larger amount of data than might otherwise be necessary to display on a classical computer screen where objects occluded or behind the user need not be displayed.

Figure 1:
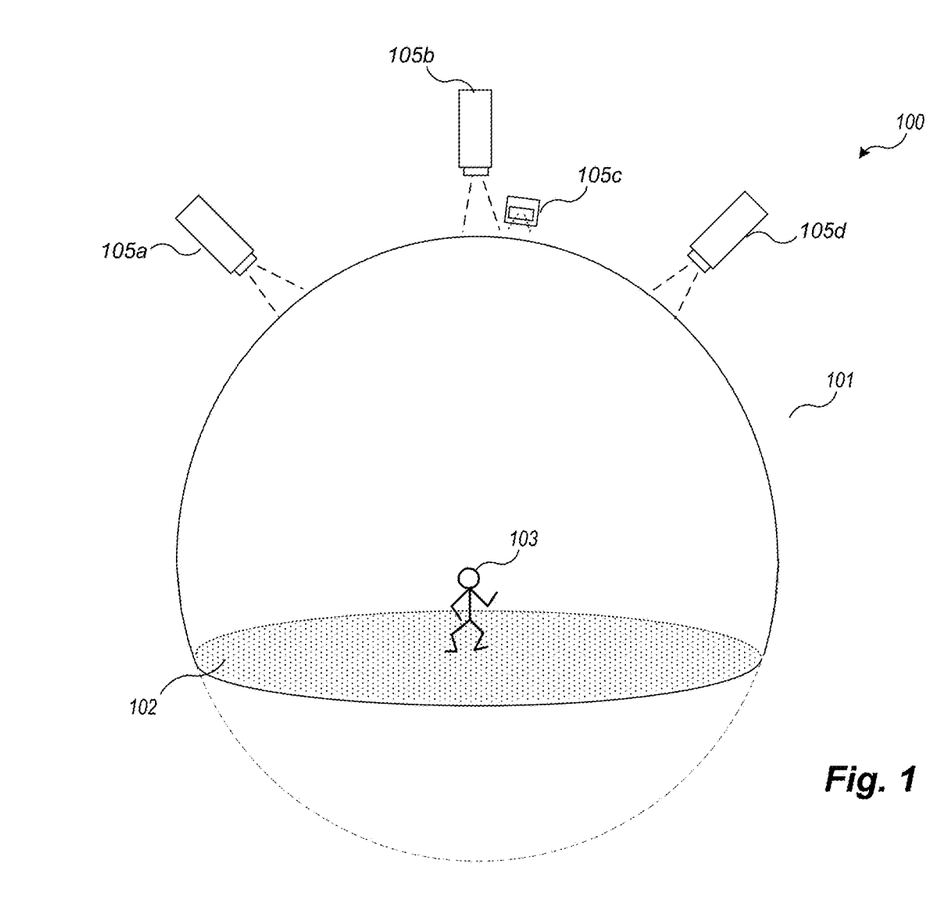
FIG. 1 is an example block diagram illustrating a scenario of a surround video projection system that uses multiple projectors to project streamed 360 degree video data to a portion of a sphere.

FIG. 1 is an example block diagram illustrating a scenario of a surround video projection system that uses multiple projectors to project streamed 360 degree video data to a portion of a sphere. The environment 100 shown in FIG. 1 may be used for example to project a 360 degree virtual reality (VR) scenario where a user 100 stands on a floor 102, which is a plane that bisects the sphere at some point, and the projectors 105a-105d project streamed video data that depicts a scene on the spherical shaped walls 101 of the environment 100. The scene may appear to be two, two and a half, or three-dimensional (2D, 2½ D, or 3D). Although the projection appears to be shown in FIG. 1 as a portion of a sphere, the projection may be spherical in nature and a 2D, 2½ D or 3D effect shown on the floor 102 as well, even though the floor 102 may be a flat plane. To provide this 360 degree spherical projection, four projectors 105a-105d are employed. Projectors 105a, 105c, and 105d project images on the "walls" and "ceiling" whereas projector 105b projects an image on the floor. The images shown by the projectors (videos are considered moving images for the purpose of this disclosure) are stitched together and blended using known software techniques. For example, "TouchDesigner" software, produced by Derivative, with some enhancements is used to create real time 2D and 3D (VR) "projection mappings" from video input for display on a portion of a sphere such as the walls 101 and floor 102 of environment 100. Other software or techniques may be similarly employed. A projection mapping maps light onto any surface and can be used to turn turning any three-dimensional object, such as environment 100, into an interactive display.

The environment shown in FIG. 1 provides one example of a surround video system. Different projections for different types of projection environments such as domes, rectangles, triangles, polygon shapes, etc., may be performed in similar manners. In addition, the same or different numbers of display systems (e.g., projectors), placed in the same or different positions, may be used depending upon the ultimate shape of the projected environment.

As described earlier, the streaming of video is limited in part by the capabilities of the display technology. 360 degree video (sometimes referred to as VR video or VR panorama video) is a video recording in which footage from "every" direction (in at least 90 degree increments) is recorded and/or generated at the same time. It inherently produces copious amounts of data. When this video is streamed for projection purposes, the problems of delivering high amounts of data quickly are worsened because the generated video must be captured by video capture technology, stitched together properly (e.g., warped, mapped, and masked) to create the 360 degree or "x" degree panorama image/video, and then projected as desired. The capacity and speed of video generation technology is limited typically by the bandwidth and speed of graphical computation units (such as GPUs) which perform the graphical processing necessary to generate (produce, synthesize, etc.) images for display or projection. Video capture technology is currently limited by the capabilities of video capture cards. The best professional video capture cards (VCCs) currently available on the market, such as a DataPath's dual displayport video capture card (e.g., VisionSC-DP$_2$) are limited to dual input feeds of 4K resolution each, although it is expected that greater resolutions may be available in the future. Meanwhile, video capture bandwidth at 60 hz is practically speaking limited to two 4K input ports.

Examples of embodiments described here provide enhanced computer-based methods, techniques, and systems for solving this bandwidth and projection problem. Example embodiments provide an Enhanced Video System ("EVS"), which enables the projection of video in real time of much higher resolutions than currently available (4K). Specifically, by "reframing" the way the video data is forwarded from the video rendering (generation, production, etc.) subsystem to the capture/projection subsystem, the EVS can render, for example, a real time, 8K video stream that can be captured and rendered by a capture/projection system whose bandwidth is limited to two 4K input ports for each video capture card. An EVS enhanced in this manner then can project a real time video stream that is a multiple of 4K chunks of data, for example, to display a 360 degree video surround environment in the portion of the sphere depicted by FIG. 1.

Although the techniques of an Enhanced Video System are generally applicable to any type of video, the phrase "video" is used generally to imply any type of video, including a still image, sequence of images, real time image stream, etc. Also, although the examples described herein often refer to a surround video environment, the techniques described herein can also be used by other shapes of environments where the video does not surround the user. Essentially, the concepts and techniques described are applicable to any video production environment. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement an Enhanced Video System to be used for streaming high resolution video in limited bandwidth hardware environments. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 2:
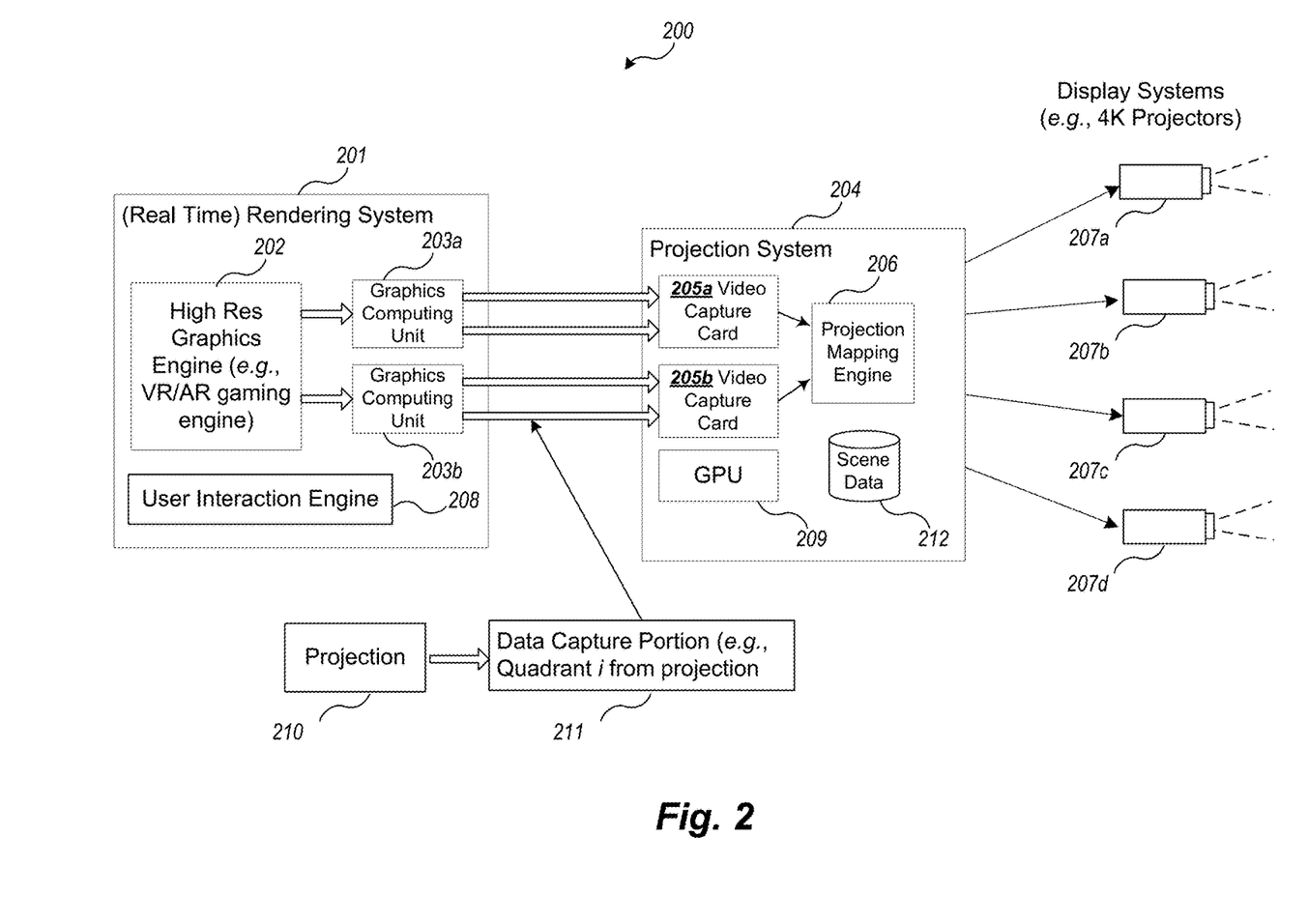
FIG. 2 is an example block diagram of components of an Enhanced Video System according to example embodiments.

FIG. 2 is an example block diagram of components of an example Enhanced Video System according to example embodiments. In one example embodiment, the Enhanced Video System (EVS) 200 comprises one or more functional components/modules that work together to deliver high bandwidth, high resolution video streams for projection in real time. For example, Enhanced Video System 200 may comprise one or more rendering systems 201 (such as a real time, interactive rendering system), one or more projection systems 204, and one or more display systems, here four projectors 207a-207d. In an example EVS, rendering system 201 comprises a high resolution graphics engine 202 (such as a VR/AR gaming engine) capable of generating high resolution video and two graphics computation units such as graphics processing units (GPUs) 203a and 203b. Other graphics computation units such as fast CPUs or other processing units may also be employed. Projection system 204 comprises two video capture cards 205a and 205b to capture the video stream generated by GPUs 203a and 203b, and forwards the captured video stream to a projection mapping engine 206. Projection mapping engine 206 consolidates and stitches together the received video stream as appropriate to project the video stream over display systems such as projectors 207a-207b to the target viewing environment (such as the portion of the sphere 100 depicted in FIG. 1). The projection mapping is warped, mapped, and masked and stitched together to create the target viewing environment. In some example projection systems 204, a GPU 209 is available for processing the video data and storage 212 is available for buffering, caching or other purposes.

In one example EVS, the rendering system 201 generates an "8K resolution" video stream according to cinematic standards, which is approximately (rounded) 8,000 pixels horizontal times 4,000 pixels vertical according to the Digital Cinema Initiatives (DCI) standard. An 8K resolution video stream is approximately 32 million pixels of data, or 4 times the amount of bandwidth needed to transfer a 4K resolution video. (An DCI 4K video stream is approximately 4,000 pixels horizontal times 2,000 pixels vertical, which is approximately 8 million pixels of data in total.) GPUs 203a and 203b are each capable of outputting two simultaneous outputs of 4K resolution video data; thus in the example EVS described two GPUs are needed to output 4 times 4K resolution worth of video data.

Figure 4:
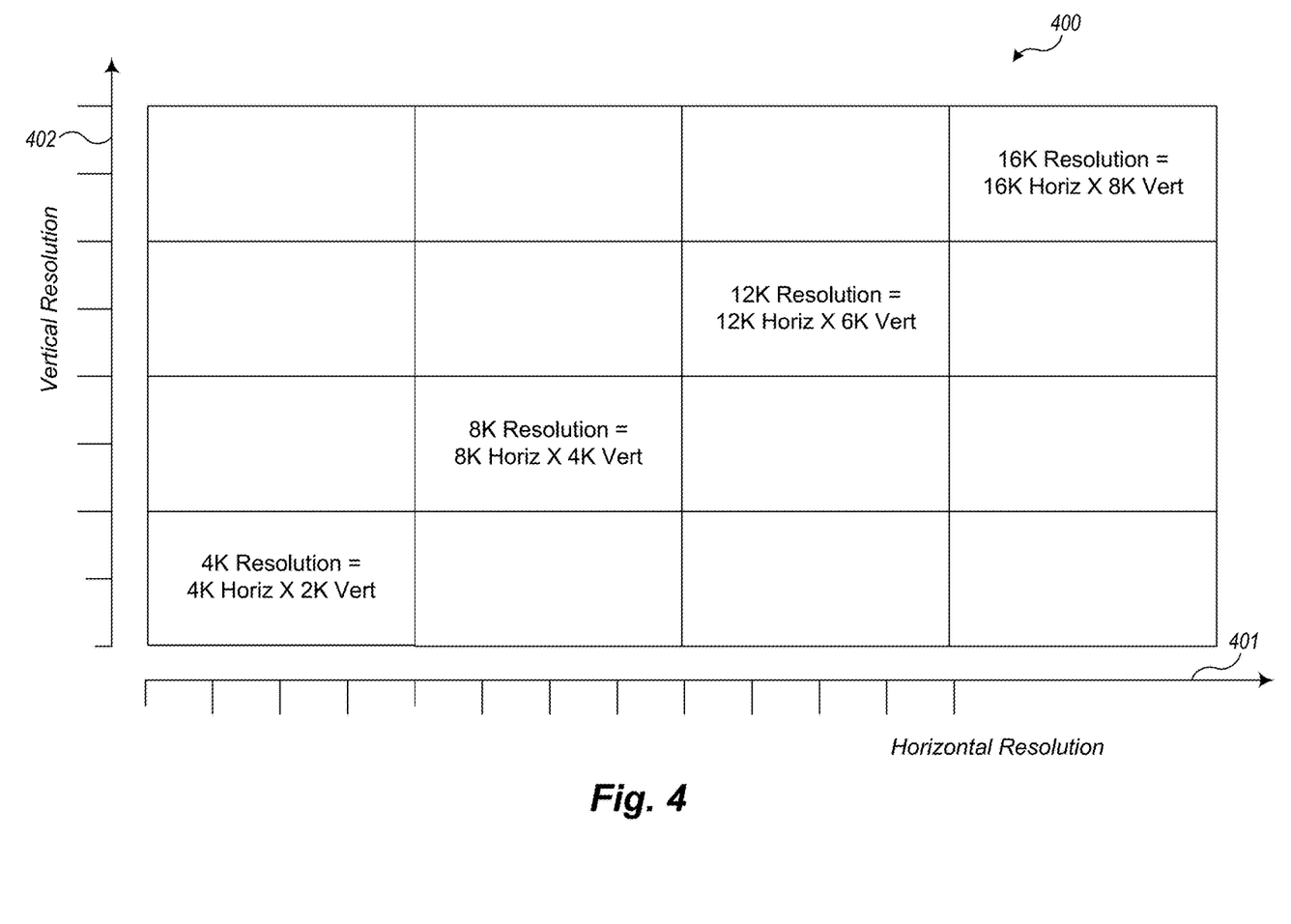
FIG. 4 is a block diagram illustration of cinematic resolutions for reference.

FIG. 4 is a block diagram illustration of cinematic resolutions for reference. Axis 401 shows horizontal resolution in 2K increments. Axis 402 shows vertical resolution in 2K increments. As observable from diagram 400, 8K resolution involves 4 times as much data as 4K resolution; 12K resolution involves 9 times as much data as 4K resolution; and 16K resolution involves 16 times as much data as 4K resolution.

In other example EVSs, the rendering system 201 can generate more resolution worth of data, say 12K or 16K, and this would indicate commensurate numbers of GPUs to be added to the EVS to generate such data. For example, 12K resolution is 9 times 4K resolution (approximately 12K horizontal X 6K vertical) as shown in FIG. 4, which using today's GPUs, would indicate incorporation of 5 GPUs. Similarly, 16K resolution is 16 times 4K resolution (approximately 16K horizontal×8K vertical) as shown in FIG. 4, which using today's GPUs, would indicate incorporation of 8 GPUs. With this increased bandwidth, however, additional capture capabilities also would need to be added.

As mentioned, rendering system 201 includes a VR/AR gaming engine 202 to generate the 8K resolution data. One example of the VR/AR gaming engine 202 employs an enhanced Unity Technologies' game engine (game engine+) to generate an 8K resolution video stream capable of projection in a video surround system or for other projected video streams. Specifically, gaming engine 202 can generate images from multiple different cameras at the same time in order to produce 360 degree output. In particular, an 8K surround video can be generated using images from six different cameras at 90 degree angles (real or virtual)—top, bottom, left, right, front, and back—and storing them in a data representation called a "cube map" or "cubic map" (CM).

Figure 3A:
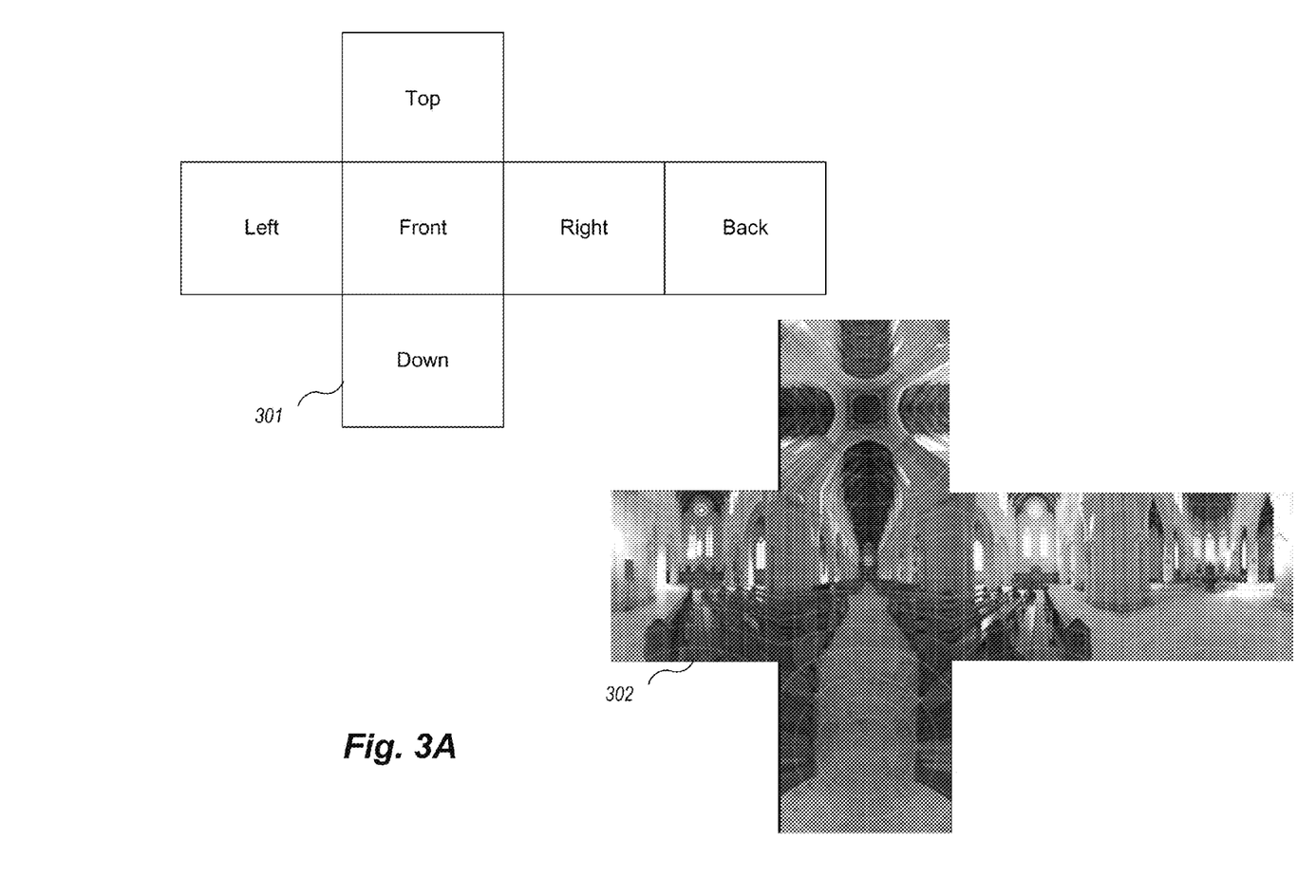
FIG. 3A is an example schematic diagram of a cube map representation along with example output of a 360 degree scene represented as a cube map or cube map projection.

FIG. 3A is an example schematic diagram of a cube map representation along with example output of a 360 degree scene represented as a cube map or cube map projection (also called a cubic map projection). A cube map shown schematically, such as in schematic 301, is a (mathematical) "map projection" for mapping a portion of the surface of a sphere (or the whole sphere) to flat images. The images are arranged like the faces of a cube (top, bottom, front, back, left, right) and are each a rectilinear projection (straight features appear as straight lines) with little if any distortion. A cube map projection, such as example 302, defines a 360 degree view from the center of the cube.

To be projected as a spherical panoramic view, for typical panorama viewing software, as well as for use by projection system 204 of FIG. 2, the data from the cube map (CM) is converted to an "equirectangular" map (EM), also referred to as an equirectangular panorama. This equirectangular map (also known as an equirectangular projection or equirectangular map projection) can then be transferred to the projection system 204 to be projected as a 360 degree video image. Graphics engine 202 employs mathematical algorithms to transform the 8K resolution data from cube maps to equirectangular maps to ready the data for 360 degree projection. Transforms from cube maps to equirectangular maps and vice versa may be performed by known mathematical conversions which can stitch together the faces of a cube into a single panorama and vice versa. (See, e.g., Bourke, *Converting to/from cubemaps*, Updated July 2016; Bourke, *Workflow for creating* 360 *spherical (equirectangular) panoramas*, December 2013, incorporated by reference herein in its entirety)

If editing of the video images is desired, this can be done while the data is presented as cube map projections. Typically, images are easier to edit as cube map projections because there is no distortion. Thus, video source images may be edited as cube map projections and then converted to equirectangular map projections for final projection as desired.

Figure 3B:
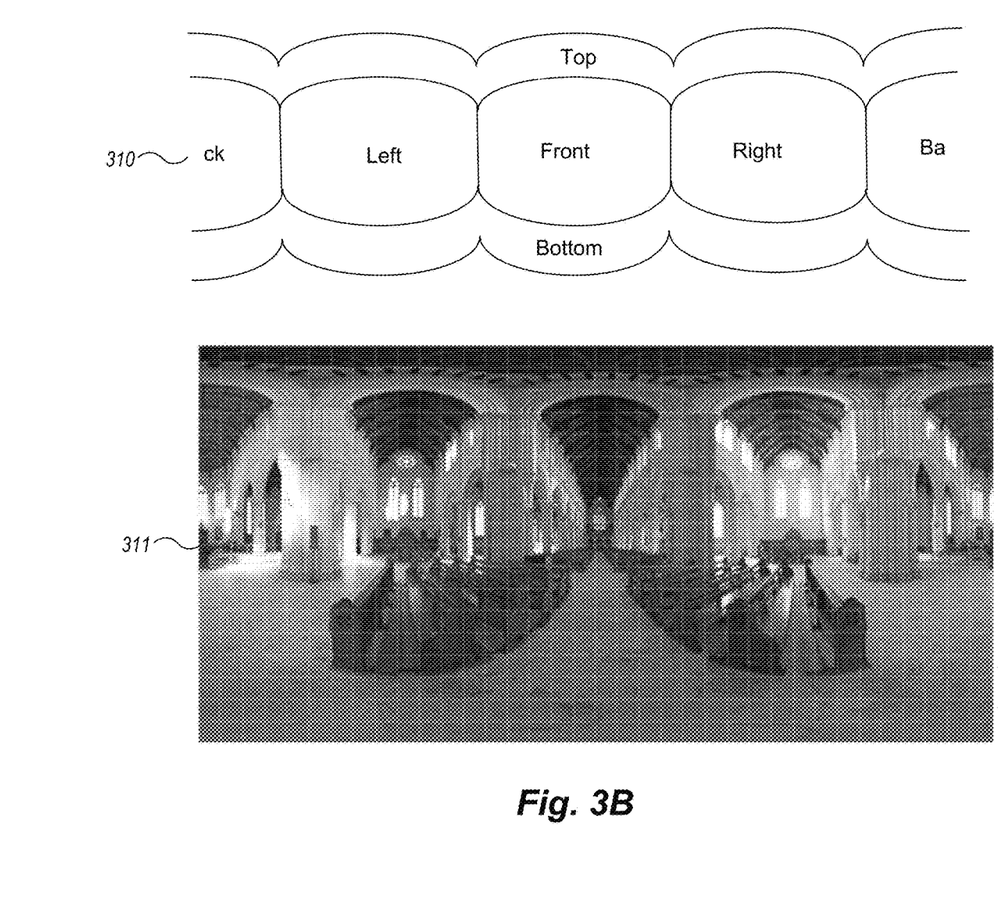
FIG. 3B is an example schematic diagram of an equirectangular map representation along with example output of a 360 degree scene (panorama) represented as an equirectangular projection.

FIG. 3B is an example schematic diagram of an equirectangular map representation along with example output of a 360 degree scene (panorama) represented as an equirectangular projection (also called an equirectangular map projection). Map 310 is a schematic showing the elements of an equirectangular map representation which maps the surface of a sphere into a flat image. Equirectangular map projection 311 illustrates a 360 degree scene capable of display as a sphere, dome, etc. In an equirectangular map or equirectangular projection, the horizontal coordinate is longitude and the vertical coordinate is latitude, with no transformation or scaling applied. This results in a fair amount of distortion of objects towards the top and bottom of the scene. In an equirectangular map projection image all verticals remain vertical, and the horizon becomes a straight line across the middle of the image. Coordinates in the image relate linearly to pan and tilt angles in the real world. The equirectangular map projection is often the default output format of a rotating (or scanning) panorama camera equipped with a fisheye lens—180° fisheye giving a full sphere at 360° rotation. Equirectangular map projections are commonly used as the projection type of the source images for spherical panorama viewers or cameras because they easily map point by point to longitude and latitude on an Earth's sphere.

In one example EVS, the graphics engine 202 of rendering system 201 produces cube map projections (from for example six camera textures) which are mapped to equirectangular map projections. Once the EM projections are produced, the projection system 204 needs to capture the (at least) 8K resolution of video data generated and transferred by the example rendering system 201. This can be accomplished using two video capture cards 205a and 205b, which because of the "reframing" enhancements described next, are sufficient to capture 8K resolution worth of video data.

Specifically, due to current hardware limitations of video capture cards which allow capture of only 4K resolution worth of data (approximately 8 million pixels) on each input path, a bottleneck in the system is created trying to get 8K resolution worth of data (approximately 32 million pixels) from the rendering system 201 to the projection system 204 for projecting onto a surface. One solution tried was to transfer the data using a 10 gigabit/second Ethernet connection. This was found to be too slow. A second solution contemplated was to devote a video capture card to each of the six cameras and then stitch together the video on the projection system end. This solution also did not work because, due to current hardware restrictions of motherboards on a personal computer, 3 PCIe cards (which support two 4K resolution inputs each—hence six cameras) that each need 16× bandwidth at 60 hertz (hz), are not supported by current motherboard design chipset numbers of lanes. In particular, only 4 PCIe cards that need 16× speed (lanes) can be supported by the current fastest available PCIe bus. Since 1 PCIe slot must be allocated to a GPU and 1 PCIe slot must be allocated to a Solid State Drive array, there are only 2 PCIe slots at 16× bandwidth and 60 hz available for video capture cards. Hence, a solution that requires 3 video capture cards was found to be not workable.

Instead, the example Enhanced Video System uses a "reframing" enhancement to transfer the data to the only 2 VCCs available—205a and 205b in FIG. 2. Specifically, instead of attempting to reduce the EM to a CM to transfer six smaller components of the video map (top, bottom, left, right, front, back) corresponding to the six different cameras, the map is "reframed" to four separate data capture portions, each corresponding to an available VCC input. Each of these data capture portions is then assigned to one of the outputs of a graphics computation unit, such as GPU 203a and GPU 203b. Each of these data capture portions are specifically selected to be less than or equal to the amount of data than can be captured by an input of a video capture card, (here less than or equal to 4K resolution worth of data) and are forwarded to and captured by one of the inputs of a video capture card, such as VCC 205a and VCC 205b. As an example, in FIG. 2, projection 210 (CM or EM) is shown reframed into "n" quadrants, and quadrant i 211 is assigned to one of the outputs of GPU 203b.

Figure 5:
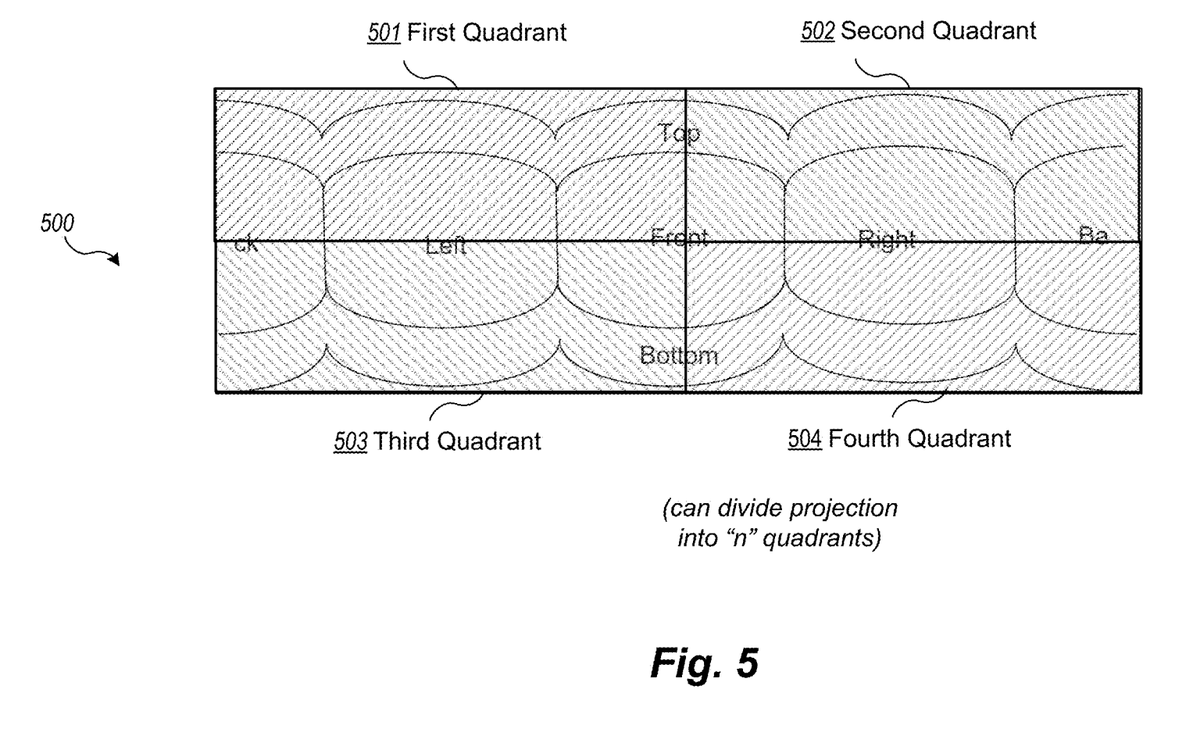
FIG. 5 is a schematic illustration of reframing an equirectangular map projection into data capture portions for transport from a rendering system to a projection system of the example enhanced projection system according to example embodiments.

FIG. 5 is a schematic illustration of reframing an equirectangular map projection into data capture portions for transport from a rendering system to a projection system of the example enhanced projection system according to example embodiments. In FIG. 5, the equirectangular projection 510 is divided into a first quadrant of data 501, a second quadrant of data 502, a third quadrant of data 503, and a fourth quadrant of data 504. Each of these quadrants can then be transferred (captured) by an input of a video card. For example, quadrant 501 and 502 can be captured by each of the two inputs of VCC 205a, respectively; and quadrant 503 and 504 can be captured by each of the two inputs of VCC 205b, respectively.

This reframing enhancement can be applied more generally to environments that require more or less available data resolution on each video capture card input path. For example, this reframing technique may be used to adjust for a different number of video capture cards and for a different size resolution of data as the inputs for video capture cards are increased (or decreased) with chipset and other hardware improvements. This is referred to as "adaptive reframing." Adaptive reframing may occur dynamically and the adjustments be computed based upon the video resolution being generated at the time. In some EVS environments, reframing apportions the six components (or some other number) of camera data from the cube map or the equirectangular projection data into data capture portions that are potentially not equal to one another, may not be "rectangular" portions (e.g., they may be any polygon), and may represent data capture portions less than or greater than 4K resolution. In other words, the reframing enhancement is generalizable to a number and size of data capture portions consistent with the resolution capacities of each VCC input path times the number of VCC input paths at that resolution. For example, an EVS design in which one VCC has two input paths each restricted to a maximum of 4K resolution worth of data (approximately 8 million pixels) and a second VCC has two input paths each restricted to a maximum of 8K resolution worth of data (approximately 32 million) may result in four data capture portions of unequal size (e.g., two portions of 4 million pixels and two portions of 32 million pixels) which would be capable of capturing 12K resolution of generated video data (approximately 72 million pixels). This is just one example, others are equally computable. Also, this reframing enhancement may be used to with any number of views (cameras or textures) provided in any projection—not just a cube map or an equirectangular map.

Returning to FIG. 2, once the 8K video is captured by the projection system 204, it is forward to the projection mapping engine 206 where it is recombined into an equirectangular map and stitched, warped, masked, and/or optimized for projection onto a surface by one or more display systems, for example, projectors 207a-207d. In an example projection system 204, the projection mapping engine 206 is a modified version of TouchDesigner by Derivative, referred to here as TD+, which adds capabilities TouchDesigner to handle 360 degree surround video. In addition to surround video, TD+ enables projection upon any type of 3D object, as well as projection of a 3D object.

Figure 6:
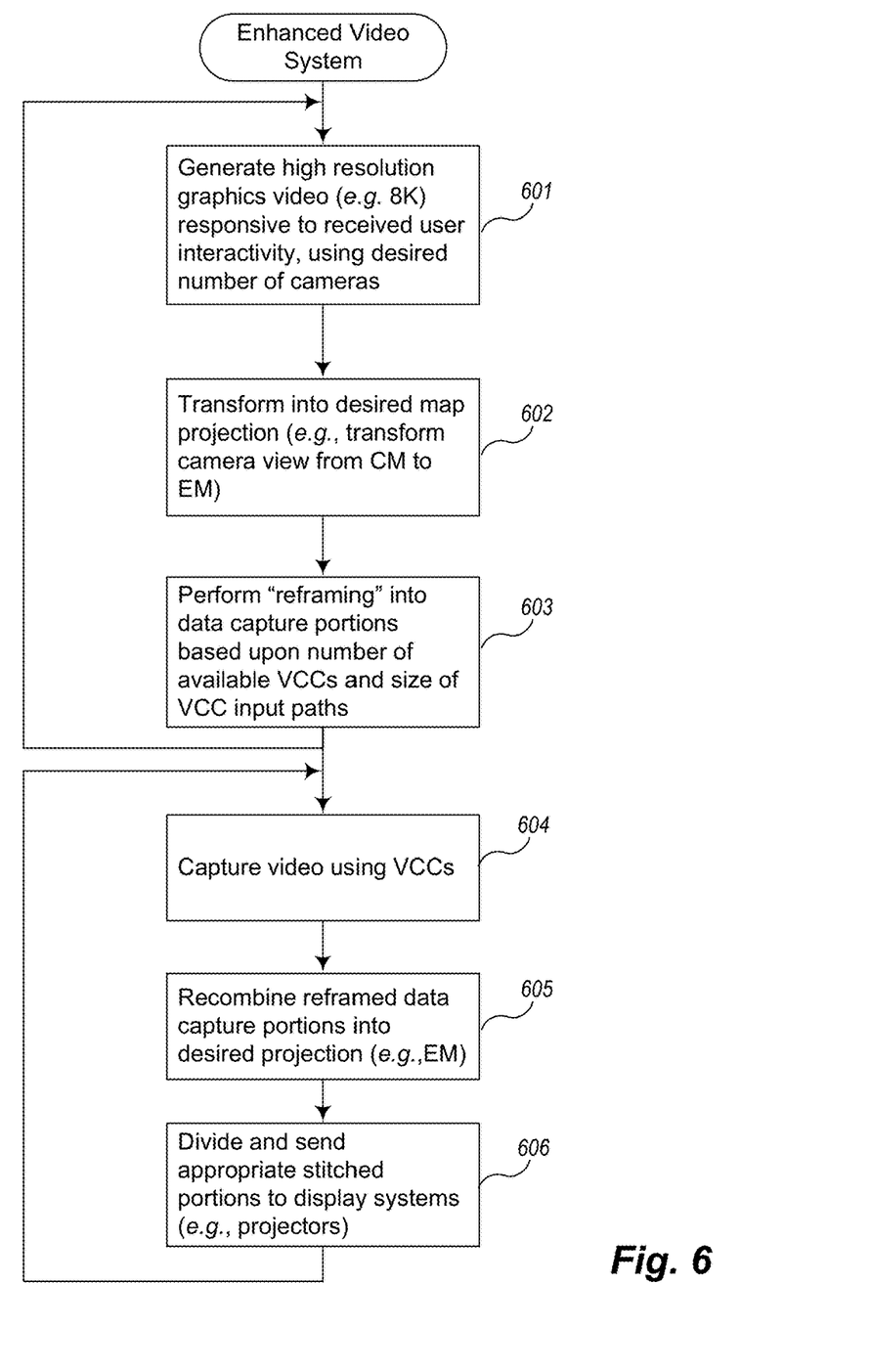
FIG. 6 is an overview of the process executed by an example Enhanced Video System to generate and project a high resolution video such as a surround video.

FIG. 6 is an overview of the logic executed by an example Enhanced Video System to generate and project a high resolution video such as a surround video. Blocks 601-603 are performed (continuously until halted) by the rendering system, for example, rendering system 201 of FIG. 2. Blocks 604-606 are performed (continuously until halted) by the projection system, for example projection system 204 of FIG. 2.

In block 601, the rendering system generates a high resolution video stream as described above. This stream may be responsive to user interactivity, sensors that sense movement of the user or of a VR/AR device such as a headset, glove, or other device that senses user movement. In response to such user movement or interaction, the content of the video may be modified, such as to bring forth additional objects, occlude others, or the like.

In block 602, the rendering system transforms the camera (view or texture) output from block 601 into a desired map projection, such as a cube map projection or an equirectangular map projection.

In block 603, the rendering system performs any reframing of the projection data into other video output, for example, quadrants or other data capture portions, in order to address any bandwidth limitations of the video capture hardware present in the projection system. The logic then returns to block 601 to continue to generate the stream of more video data and to process it for capture. (Of note, these logic steps are continuously performed when working with streamed data—as one portion of video is generated, it is transformed and reframed while a next portion of video is generated.)

In block 604, the projection system continuously captures the streamed data capture portions using one or more video capture cards. Captured data is then recombined into a desired projection in block 605.

In block 606, the recombined projection data is split and stitched, masked, and warped as appropriate and transferred (sent, forwarded, etc.) to the display systems (e.g., projectors) to be projected or otherwise rendered onto the desired surface. The logic then returns to block 604 to continue to capture the stream of video data and to process it for projection. (Of note, these logic steps are continuously performed when working with streamed data—as one portion of video is captured, it is recombined and stitched and transferred to the projectors while a next portion of video is captured.)

Figure 7:
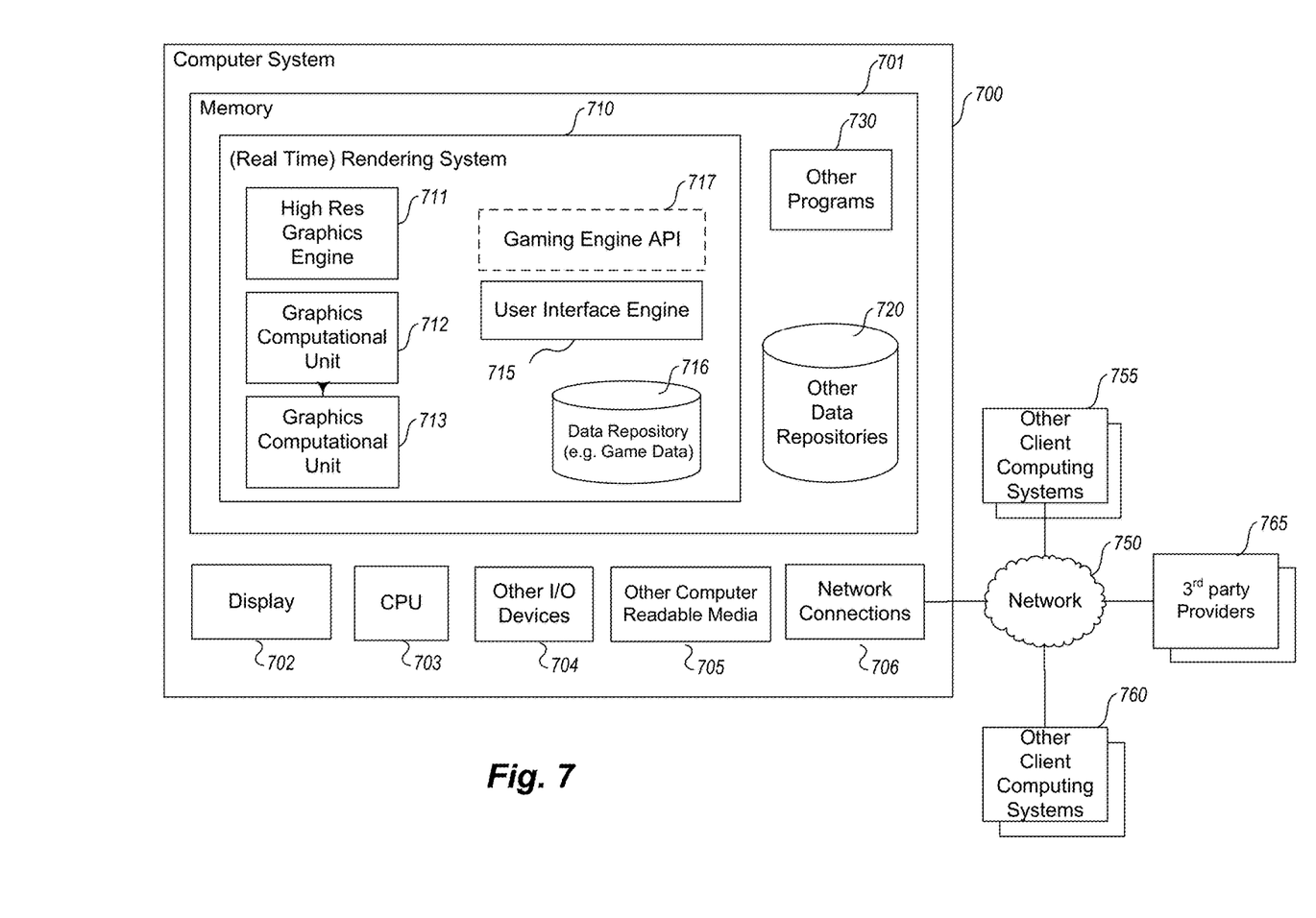
FIG. 7 is an example block diagram of a computing system for practicing embodiments of a rendering system of an example Enhanced Video System.

FIG. 7 is an example block diagram of a computing system for practicing embodiments of a rendering system of an example Enhanced Video System. Note that one or more general purpose virtual or physical computing systems suitably instructed or a special purpose computing system may be used to implement the rendering system of an example EVS. Further, these systems may be implemented in software, hardware, firmware, or in some combination to achieve the capabilities described herein.

Note that one or more general purpose or special purpose computing systems/devices may be used to implement the described techniques. However, just because it is possible to implement the rendering system on a general purpose computing system does not mean that the techniques themselves or the operations required to implement the techniques are conventional or well known.

The computing system 700 may comprise one or more server and/or client computing systems and may span distributed locations. In addition, each block shown may represent one or more such blocks as appropriate to a specific embodiment or may be combined with other blocks. Moreover, the various blocks of the rendering system 710 may physically reside on one or more machines, which use standard (e.g., TCP/IP) or proprietary interprocess communication mechanisms to communicate with each other, although the graphics aspects of this computing system is likely to reside on a single machine for speed and bandwidth delivery.

In the embodiment shown, computer system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The rendering system 710 is shown residing in memory 701. In other embodiments, some portion of the contents, some of, or all of the components of the rendering system 710 may be stored on and/or transmitted over the other computer-readable media 705. The components of the rendering system 710 preferably execute on one or more CPUs 703 and manage the generation of streamed video data, as described herein. Other code or programs 730 and potentially other data repositories, such as data repository 720, also reside in the memory 701, and preferably execute on one or more CPUs 703. Of note, one or more of the components in FIG. 7 may not be present in any specific implementation. For example, some embodiments embedded in other software may not provide means for user input or display.

In a typical embodiment, the rendering system 710 includes one or more high resolution graphics display engines 711 (such as a Unity Game engine described above), one or more graphics computation units (e.g., GPUs) 712, and 713, a user interface engine 715. A data repository 716 for storing game related data, and optionally gaming engine API 717 for accessing and controlling the graphics engine 711 and/or data 716. In at least some embodiments, the data repository 716 is provided external to the rendering system and is available, potentially, over one or more networks 750. Such data is not likely data requiring speed or responsiveness, for example, profile data may be stored this way. Other and/or different modules may be implemented. In addition, the rendering system 710 may interact via a network 750 with other client computing systems 755 and 760, and/or one or more third-party information provider systems 765, such as advertiser systems that supply integrated advertisements into the streaming video.

In an example embodiment, components/modules of the rendering system 710 are implemented using standard programming techniques. For example, the rendering system 710 may be implemented as a "native" executable running on the CPU 103, along with one or more static or dynamic libraries. In other embodiments, the rendering system 710 may be implemented as instructions processed by a virtual machine. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In some scenarios, the embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the rendering system 710 (e.g., in the data repository 716) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 716 may be implemented as one or more database systems, file systems, or any other technique for storing such information, or any combination of the above, including implementations using distributed computing techniques.

Also the example rendering system 710 may be implemented in a distributed environment comprising multiple, even heterogeneous, computer systems and networks. Different configurations and locations of programs and data are contemplated for use with techniques of described herein. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX- RPC, SOAP, etc.) and the like. Other variations are possible. Also, other functionality could be provided by each component/module, or existing functionality could be distributed amongst the components/modules in different ways, yet still achieve the functions of an rendering system.

Furthermore, in some embodiments, some or all of the components of the rendering system 710 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Such computer program products may also take other forms in other embodiments. Accordingly, embodiments of this disclosure may be practiced with other computer system configurations.

Figure 8:
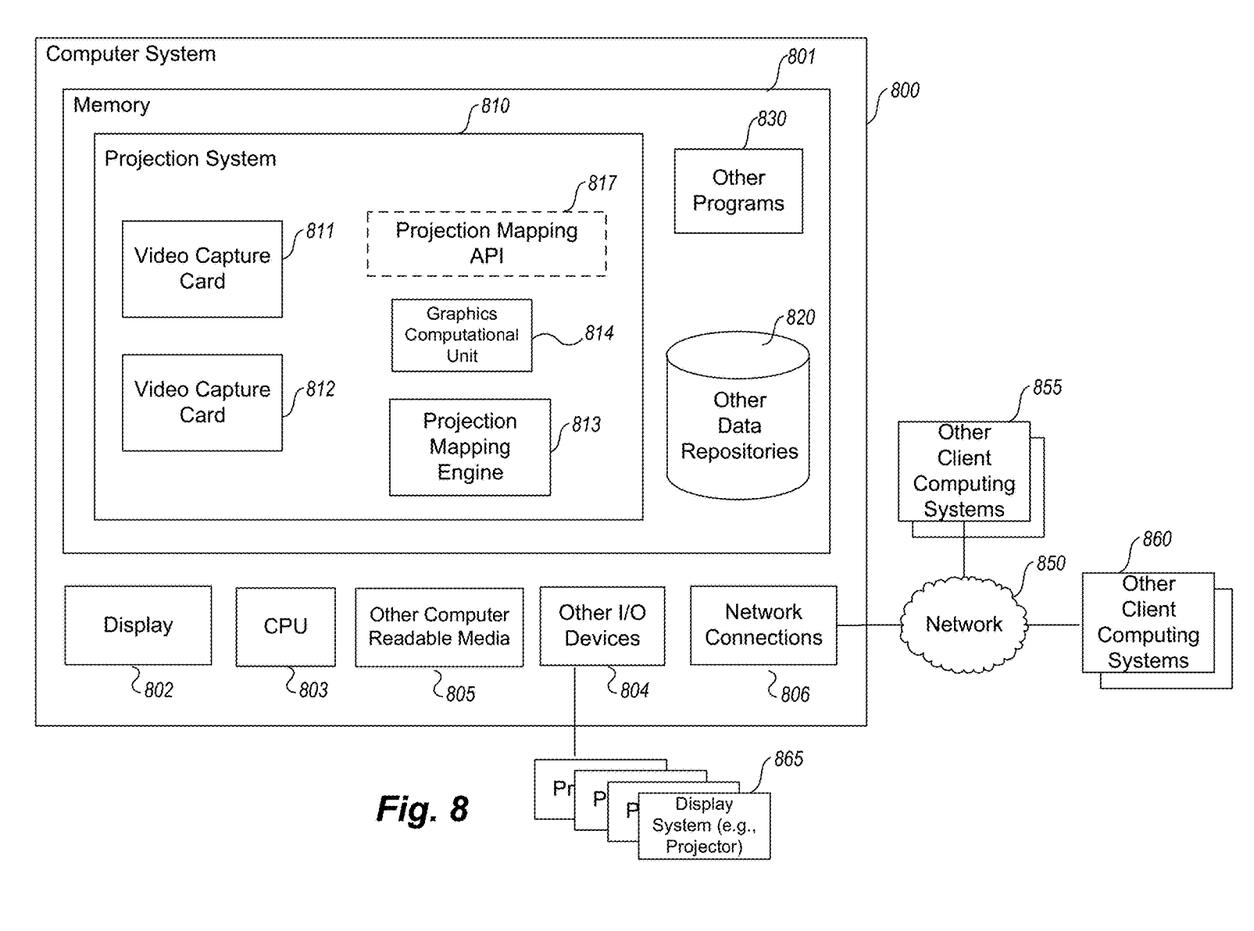
FIG. 8 is an example block diagram of a computing system for practicing embodiments of a projection system of an example Enhanced Video System.

FIG. 8 is an example block diagram of a computing system for practicing embodiments of a projection system of an example Enhanced Video System. The computing system of FIG. 8 operates similarly to the computing system for practicing embodiments of the rendering system of FIG. 7, except that it contains potentially different components.

For example, in the embodiment shown, computer system 800 comprises a computer memory ("memory") 801, a display 802, one or more Central Processing Units ("CPU") 803, Input/Output devices 804, other computer-readable media 805, and one or more network connections 806. The projection system 810 is shown residing in memory 801. In other embodiments, some portion of the contents, some of, or all of the components of the projection system 810 may be stored on and/or transmitted over the other computer-readable media 805. The display systems (e.g., projectors) 865 are shown connected to the projection system 810 through I/O device interface 804. The components of the projection system 810 preferably execute on one or more CPUs 803 and manage the capture and projection of streamed video data, as described herein. Other code or programs 830 and potentially other data repositories, such as data repository 820, also reside in the memory 801, and preferably execute on one or more CPUs 803. Of note, one or more of the components in FIG. 8 may not be present in any specific implementation. For example, some embodiments embedded in other software may not provide means for user input or display.

In a typical embodiment, the projection system 810 includes one or more video capture cards 811 and 812 as described herein, a projection mapping engine 813, a graphics computation unit (e.g., GPU) 814, and optionally a projection mapping API 817 that is available through standard API mechanisms. These components can be distributed or combined, implemented using standard programming techniques, use synchronous or asynchronous methodologies, etc., as described with reference to FIG. 7.

Different configurations and locations of programs and data are contemplated for use with techniques of described herein. In addition, the rendering system 710 and projection system 810 may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner are contemplated. Also, other functionality could be provided by each component/module, or existing functionality could be distributed amongst the components/modules in different ways, yet still achieve the functions of an projection system.

Furthermore, in some embodiments, some or all of the components of the projection system 810 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of the invention. For example, the methods and systems for performing generation and projection of streamed video data discussed herein are applicable to other architectures other than a personal computer architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:
1. A streaming video rendering system, comprising:
a projection computing system, comprising one or more video capture cards attached to an interface bus of the projection computing system, wherein the maximum number of the one or more video capture cards available to process a maximum bandwidth of data at a highest speed is limited by hardware requirements of the interface bus;
a rendering computing system, comprising a high resolution graphics engine and at least one graphics computation unit, wherein the high resolution graphics engine is configured to generate a high resolution video stream panoramic projection using projections from projection sources that exceed the maximum bandwidth of data that can be captured by the maximum number of the one or more video capture cards attached to the interface bus if each of the projections were forwarded to a discrete input path of each of the one or more video capture cards, wherein the rendering computing system is configured to reframe the panoramic projection of the high resolution video stream to a plurality of data capture portions that can each be captured by a corresponding discrete input of the one or more video capture cards such that the entire data content of the panoramic projection is able to be captured by the maximum number of video capture cards attached to the interface bus, and wherein the plurality of data capture portions are forwarded via the at least one graphics computation unit to the projection computing system;

wherein the projection computing system is configured to receive the data capture portions on the maximum number of video capture cards, recombine the captured data capture portions of video data into the panoramic projection, and transmit a stitched video stream for display; and a plurality of display units, each configured to receive a portion of the stitched video stream and render the received portion on a surface.

2. The system of claim 1 wherein the maximum number of video capture cards available to process a maximum bandwidth of data at the highest speed is two.

3. The system of claim 2 wherein the video capture cards are Peripheral Component Interconnect Express (PCIe) 16× cards.

4. The system of claim 1 wherein each video capture card has two inputs, each of which can capture 4K resolution worth of data.

5. The system of claim 1 wherein the projections from projection sources are from at least six cameras or textures and the rendering computing system is configured to reframe the projections from the projection sources by reframing the projections into four data capture portions, each of which is less than or equal to 8 million pixels of data.

6. The system of claim 1 wherein the panoramic projection is a cube projection having six images corresponding to top, bottom, left, right, front, and back views of a scene.

7. The system of claim 1 wherein the panoramic projection is an equirectangular projection having image data corresponding to a top, bottom, left, right, front, and back views of a scene.

8. The system of claim 1 wherein the high resolution graphics engine is an augmented reality or virtual reality gaming engine.

9. The system of claim 1 wherein the surface upon which the stitched video stream is rendered is a portion of a sphere.

10. The system of claim 9 wherein the surface upon which the stitched video stream is rendered has a floor and images are projected on the floor.

11. The system of claim 1 wherein the plurality of display units are projectors.

12. A video stream rendering computer system, comprising:
a high resolution graphics engine; and
at least one graphics computation unit;
wherein the high resolution graphics engine is configured to:
generate a high resolution video stream as an equirectangular projection or a cube projection;
reframe the generated high resolution video stream from the equirectangular projection or cube projection as a different number of data capture portions, the size of content of each portion smaller than or equal to a maximum size of a corresponding video card input path;
transmit the data capture portions via the at least one graphics computation unit so that each data capture portion is capturable by a corresponding video capture card of one or more video capture cards attached to an interface bus and wherein the captured data capture portions are re-combinable into the equirectangular projection or cube projection to be divided into one or more display portions and sent to one or more corresponding display systems that each render the received display portion on a surface.

13. The rendering computer system of claim 12 wherein the number of the video capture cards attached to the interface bus is limited by hardware requirements of the interface bus to process video data at a maximum speed and throughput.

14. The rendering computer system of claim 12 wherein the number of the video capture cards is limited to two video capture cards.

15. The rendering computer system of claim 12 wherein the interface bus is a Peripheral Component Interconnect Express (PCIe) bus connected to a computing system.

16. The rendering computer system of claim 12 wherein the high resolution video stream is an 8K resolution video stream.

17. The rendering computer system of claim 12 wherein the high resolution video stream is a 12K or a 16K resolution video stream.

18. The rendering computer system of claim 12 wherein the number of data capture portions is four so that each data capture portion is less than or equal to a 4K resolution worth of data and is able to be processed by a single input path of a video capture card.

19. A method for producing a surround video, comprising:
generating a high resolution graphics video using a projection source that produces at least an 8K resolution image;
transforming the high resolution graphics video into a cube projection or equirectangular projection that includes at least 8K resolution worth of data;
reframing the cube projection or equirectangular projection into a number of data capture portions based upon a number of one or more video capture cards available and a resolution capacity of each input path of each video capture card, wherein each input path of each video capture card can process only a portion of the at least 8K resolution of data; and
transmitting and allocating the data capture portions between the input paths of the available video capture cards, wherein the available video capture cards capture the transmitted and allocated data capture portions and the captured data capture portions are recombined into the cube projection or equirectangular projection for rendering as a surround video by a plurality of display systems.

20. The method of claim 19 wherein the surround video is rendered by projected the surround video onto a dome, a portion of a sphere, or a polygon, or a three dimensional object.

21. The method of claim 19 wherein the generating a high resolution graphics video using projection sources uses at least six camera views or a panorama.

\* \* \* \* \*

UNITED STATES PATENT AND TRADEMARK OFFICE
CERTIFICATE OF CORRECTION

PATENT NO. : 10,321,109 B1
APPLICATION NO. : 15/622009
DATED : June 11, 2019
INVENTOR(S) : Mars Tanumihardja et al.

Page 1 of 1

It is certified that error appears in the above-identified patent and that said Letters Patent is hereby corrected as shown below:

In the Claims

In Column 13, Line 36 (Claim 3), "16x" should be --16X--.

In Column 15, Line 2 (Claim 20), "projected" should be --projecting--.

Signed and Sealed this
Sixteenth Day of July, 2019

Andrei Iancu
*Director of the United States Patent and Trademark Office*